(12) United States Patent
Sun

(10) Patent No.: US 7,116,780 B2
(45) Date of Patent: Oct. 3, 2006

(54) HOUSING ASSEMBLY OF A PORTABLE ELECTRONIC DEVICE

(75) Inventor: Hsueh-Wen Sun, Taipei (TW)

(73) Assignee: Benq Corporation, Taoyuan (TW)

( * ) Notice: Subject to any disclaimer, the term of this patent is extended or adjusted under 35 U.S.C. 154(b) by 278 days.

(21) Appl. No.: 10/655,123

(22) Filed: Sep. 5, 2003

(65) Prior Publication Data

US 2004/0053649 A1 Mar. 18, 2004

(30) Foreign Application Priority Data

Sep. 18, 2002 (TW) .............................. 91214710 A

(51) Int. Cl.
*H04M 1/03* (2006.01)
*H04B 1/38* (2006.01)

(52) U.S. Cl. ........................... 379/433.01; 379/433.12; 455/575.1; 455/90.3

(58) Field of Classification Search .......... 379/433.01, 379/433.12, 428.01; 455/550.1, 575.1, 90.3; 361/777

See application file for complete search history.

(56) References Cited

U.S. PATENT DOCUMENTS 5,636,105 A * 6/1997 Inomata et al. ............. 361/777
6,341,227 B1 * 1/2002 Moster et al. ........... 455/550.1

* cited by examiner

*Primary Examiner*—Harry S. Hong
(74) *Attorney, Agent, or Firm*—Michael Bednarek; Pillsbury Winthrop Shaw Pittman LLP

(57) ABSTRACT

The present invention provides a housing assembly of a portable electronic device. The housing assembly includes a first housing, a second housing and a third housing with two holes and two openings thereon. When the first and second housings are assembled together, the third housing is in an inner space defined by the first and second housings. A U-shape slider is slidably disposed in the third housing through the two openings. When the third housing is in the inner space, two arms of the U-shape slider have slots to accommodate protrusions of the first and second housings respectively.

15 Claims, 9 Drawing Sheets

HOUSING ASSEMBLY OF A PORTABLE ELECTRONIC DEVICE

CROSS REFERENCE TO RELATED APPLICATIONS

This Application claims priority to Taiwan Patent Application No. 091214710 entitled "Housing Assembly of A Portable Electronic Device," filed Sep. 18, 2002.

Field of the Invention

The present invention relates to a housing assembly of a portable electronic device, and more particularly, to a housing assembly of a mobile phone.

BACKGROUND OF THE INVENTION

Portable electronic devices have become more and more popular nowadays with the development of technology. For example, mobile phones have become one of the essential communication devices. In addition to the communication function, other functions, such as replaceable housing assemblies, are i factors consumers will take into consideration when purchasing mobile phones.

Generally speaking, a replaceable housing assembly includes a front housing and a rear housing. One of the housings has a clasp and the other has a corresponding indentation. By the coordination of the clasp and the indentation, the housing assembly can be taken apart manually and be replaced. But the design can't cover both convenience and stability of housing constructing at the same time. For instance, for the convenience of assembling, the extended portion is made shorter to be taken apart from the indentation easily; however, the fixation of the clasp and the indentation is not so reliable here.

To prevent the clasp from loosening from the indentation, the extended portion is made longer. However, when users want to change a housing, they face harder resistance in taking the clasp apart from the indentation and it causes inconveniences. It is important that convenience and stability should both be taken into consideration when a portable electronic device is designed.

SUMMARY OF THE INVENTION

The present invention provides a housing assembly of a portable electronic device, and more particularly, to a housing assembly of a mobile phone.

The housing assembly of a portable electronic device includes a first housing, a second housing, a third housing and a U-shaped slider. If the portable electronic device is a mobile phone, then the third housing is a module of the mobile phone. The first housing has two side-portions, and the two side-portions respectively have a first protrusion inside the first housing. The second housing has two side-portions, and the two side-portions respectively have a second protrusion inside the second housing. The first housing and the second housing are assembled to define an inner space. The third housing has two openings and at least two holes.

The U-shaped slider has two arms substantially parallel to each other. The two arms respectively have a first slot and a second slot for accommodating the first and the second protrusion. The two arms of the U-shaped slider are slidably disposed within the third housing by respectively passing through the two openings. The U-shaped slider further comprises a locking device for fastening the first housing with the second housing. The locking device has two protrusive points respectively on the two arms, and the third housing has at least two recesses corresponding to the two protrusive points for bonding together the first housing and the second housing.

A first slider and a second slider can substitute for the U-shaped slider. The first slider and the second slider are slidably disposed within the third housing by passing through the openings. The first slider and the second slider have a first slot and a second slot for accommodating the first and second protrusions through the holes of the third housing, when the third housing is in the inner space. The first and second sliders include a locking device. The locking device can be two protrusive points of the first and second sliders, and the third housing has at least two recesses corresponding to the two protrusive points. The two protrusive points are in the recesses respectively to bond the first housing and the second housing, thus the housing assembly is completely assembled.

Detailed Description of the Invention

The present invention provides a housing assembly of a portable electronic device, for example, a mobile phone. Using the sliders to fix the housing components makes the housing assembly easily be taken apart. The housing assembly is a replaceable component, and users can change the housing components they please.

Figure 1:
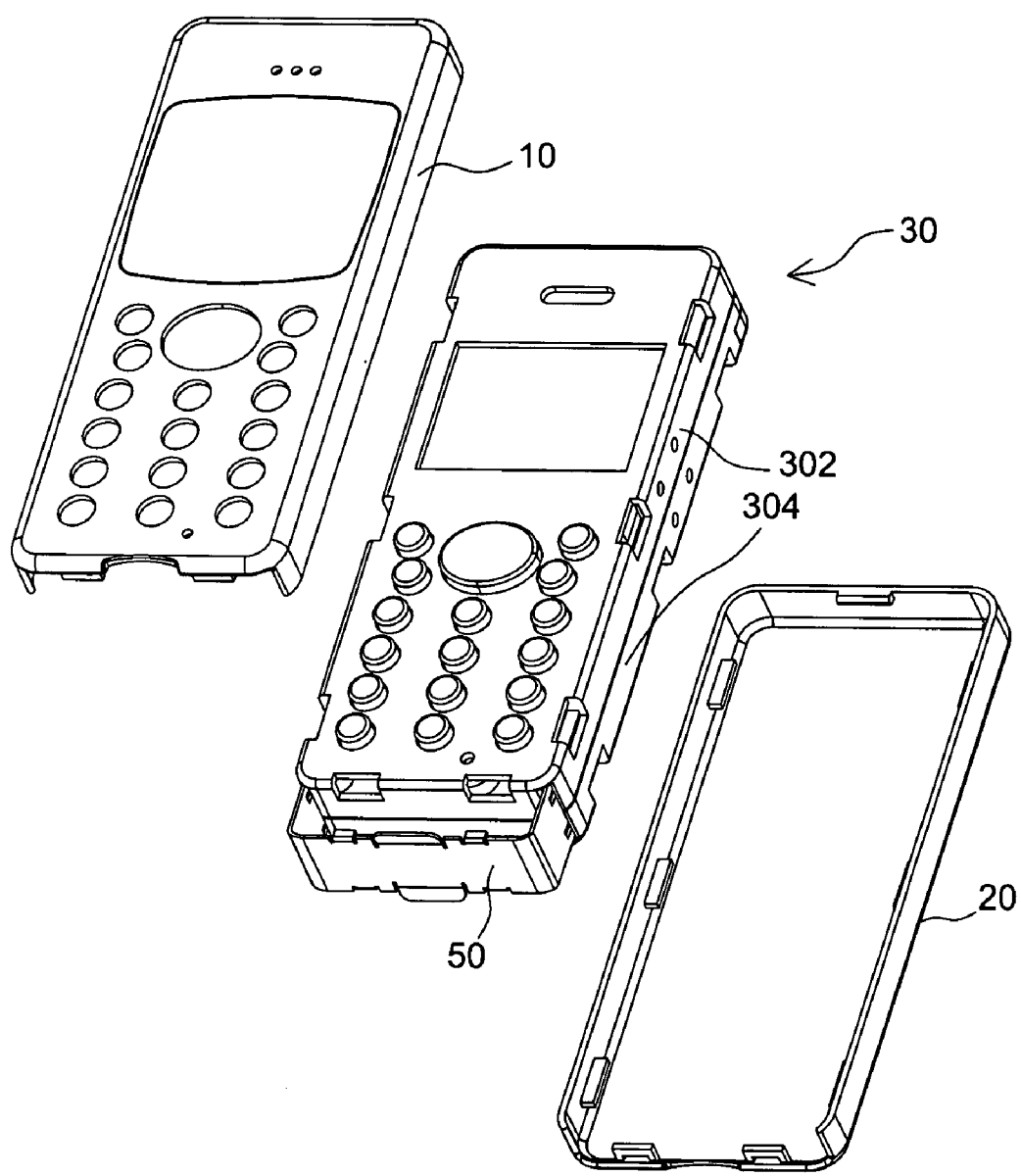
FIG. 1 shows a schematic diagram of the portable electronic device (a mobile phone) of the present invention.

As shown in FIG. 1, the third housing 30 is a mobile phone module, and the housing is constituted by the third front housing 302 and rear housing 304. The U-shaped slider 50 is slidably disposed within the third housing 30. The first housing 10 and the second housing 20 constitute the outer housing of the mobile phone. Changing the mobile phone housing means to change the first housing 10 and the second housing 20.

Figure 2:
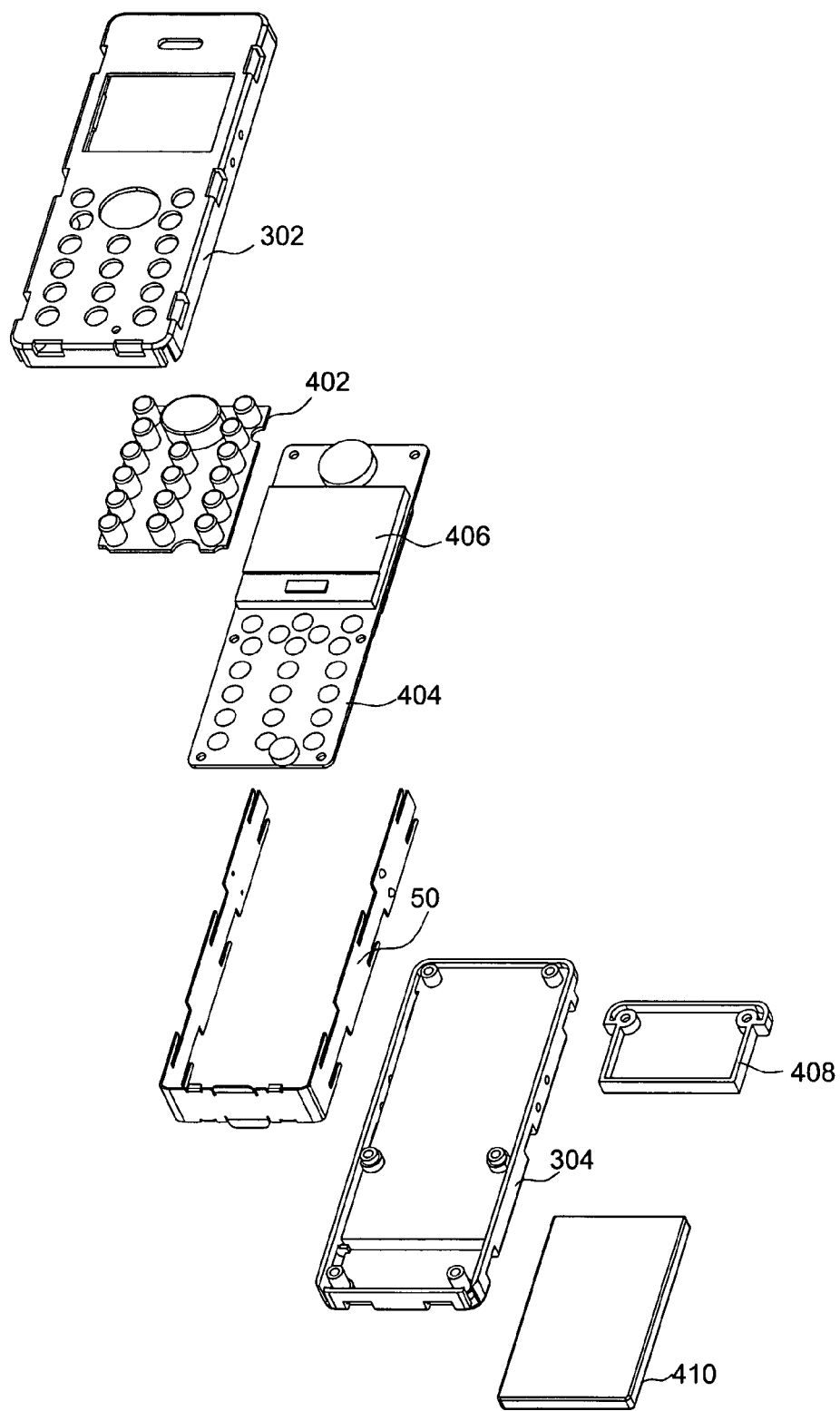
FIG. 2 shows an explosive view of the mobile phone module.

FIG. 2 shows an explosive view of the mobile phone module. As shown in FIG. 2, the mobile phone module includes conventional components, such as a keypad 402, a printed circuit board 404 and on the board 404, a liquid crystal display board 406, an antenna 408, a battery 410 and so on. The above mentioned components, along with the third front housing 302 and the rear housing 304, constitute the third housing 30 shown in FIG. 1, with the keypad 402 either being included or not. As shown in FIG. 1, the keypad 402 can be disposed on the printed circuit board 404 and stretches out from the third front housing 302. The keypad 402 can also be disposed upon the third front housing 302 and fixed by the first housing 10. Thus, the keypad 402 can be changed when the first housing is changed.

Figure 3A:
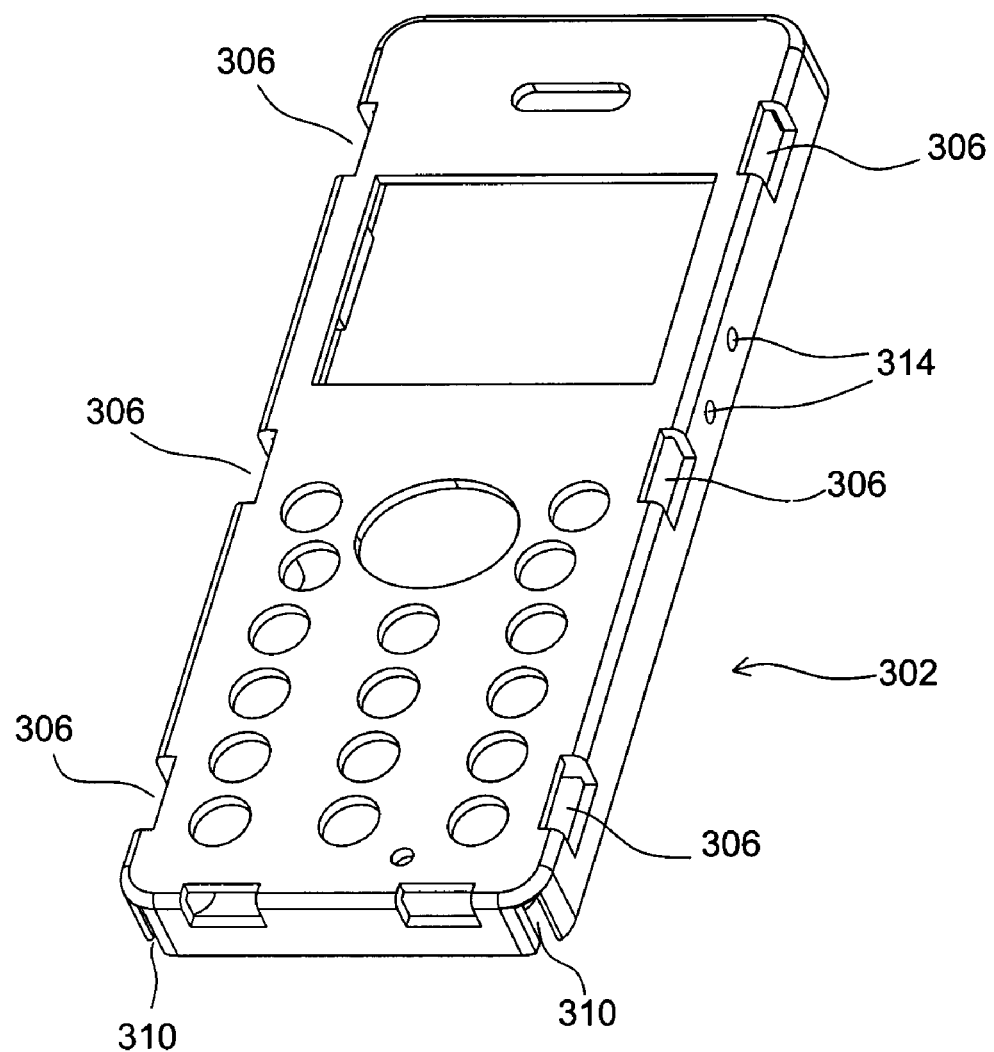
FIGS. 3A–3C show schematic diagrams of the embodiments of the third housing of the present invention.
Figure 3B:
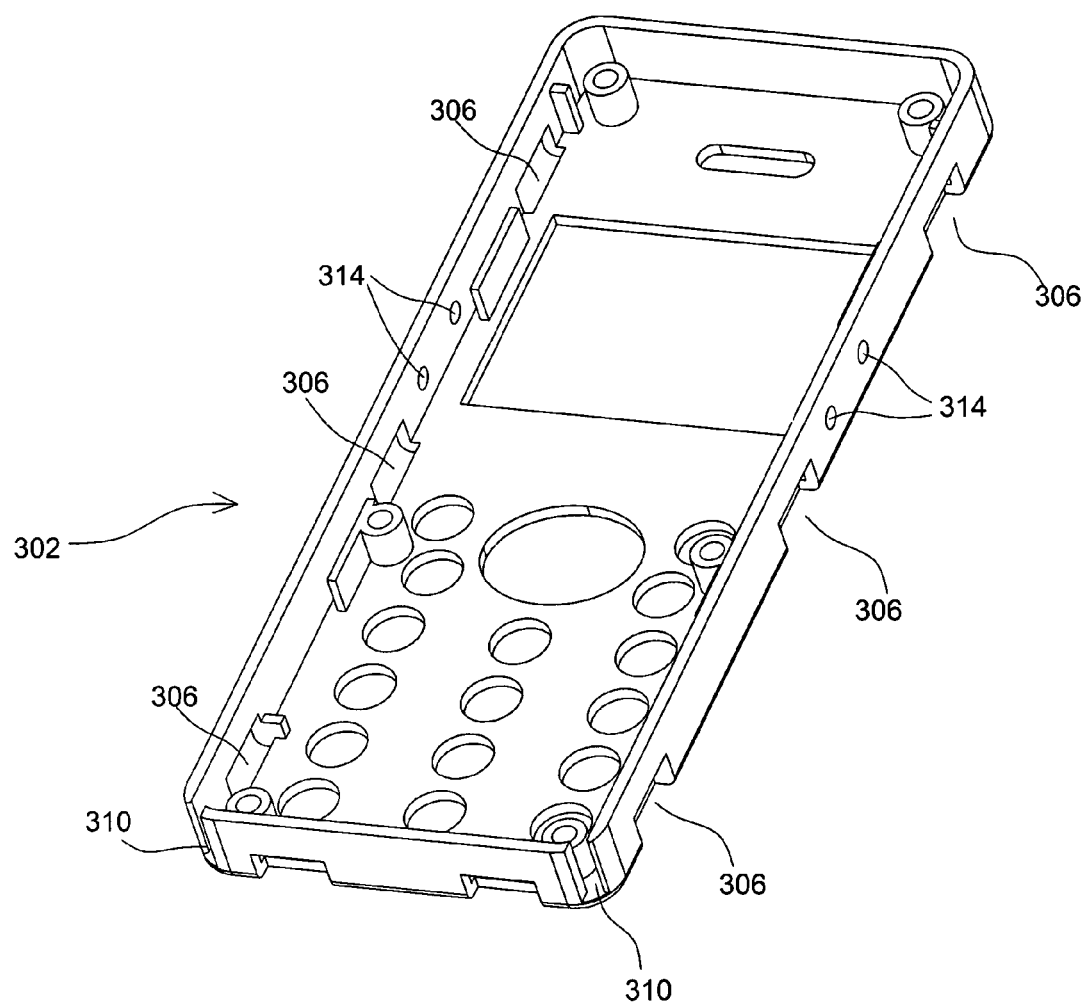
Figure 3C:
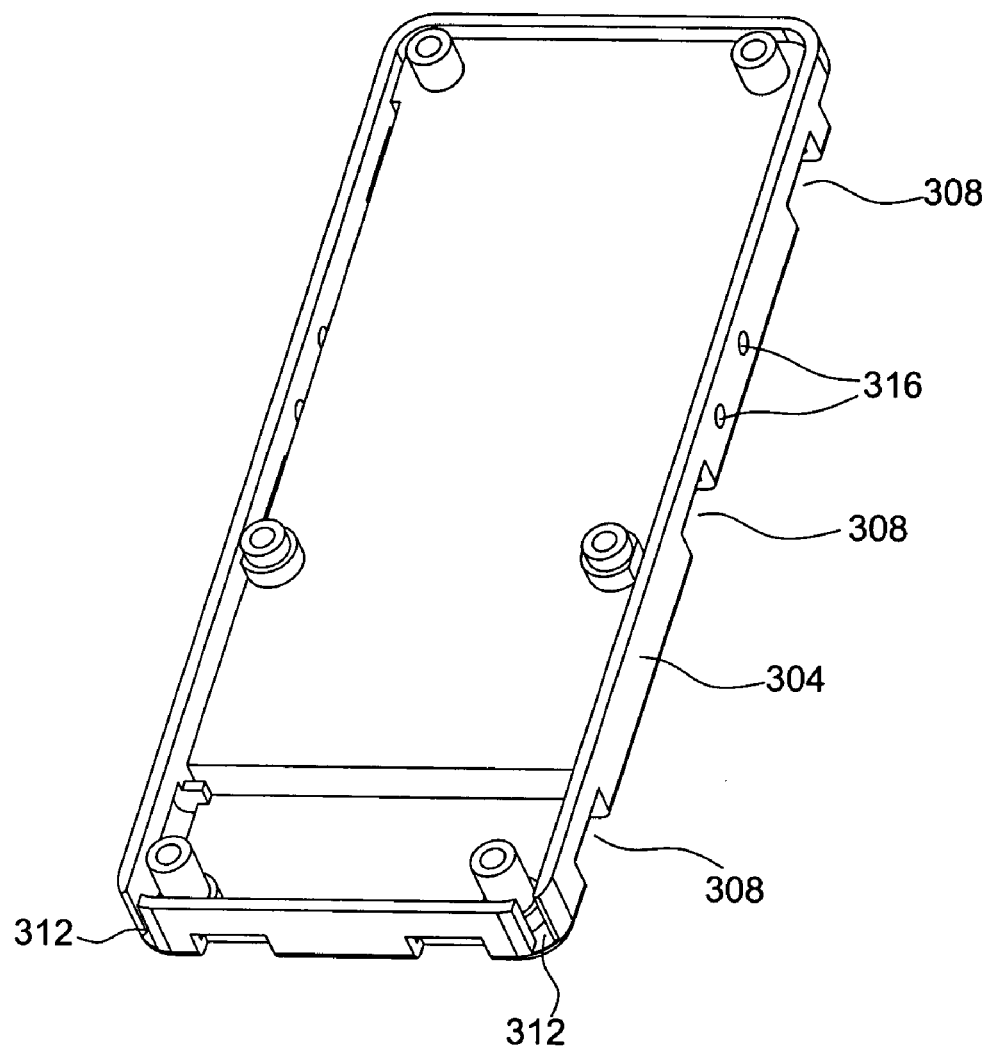

FIGS. 3A–3C show schematic diagrams of the embodiments of the third housing of the present invention. As shown in FIGS. 3A and 3B, the third front housing 302 includes a hole 306 and an opening 310. As shown in FIG. 3C, the third rear housing 304 includes a hole 308 and an opening 312.

Figure 4:
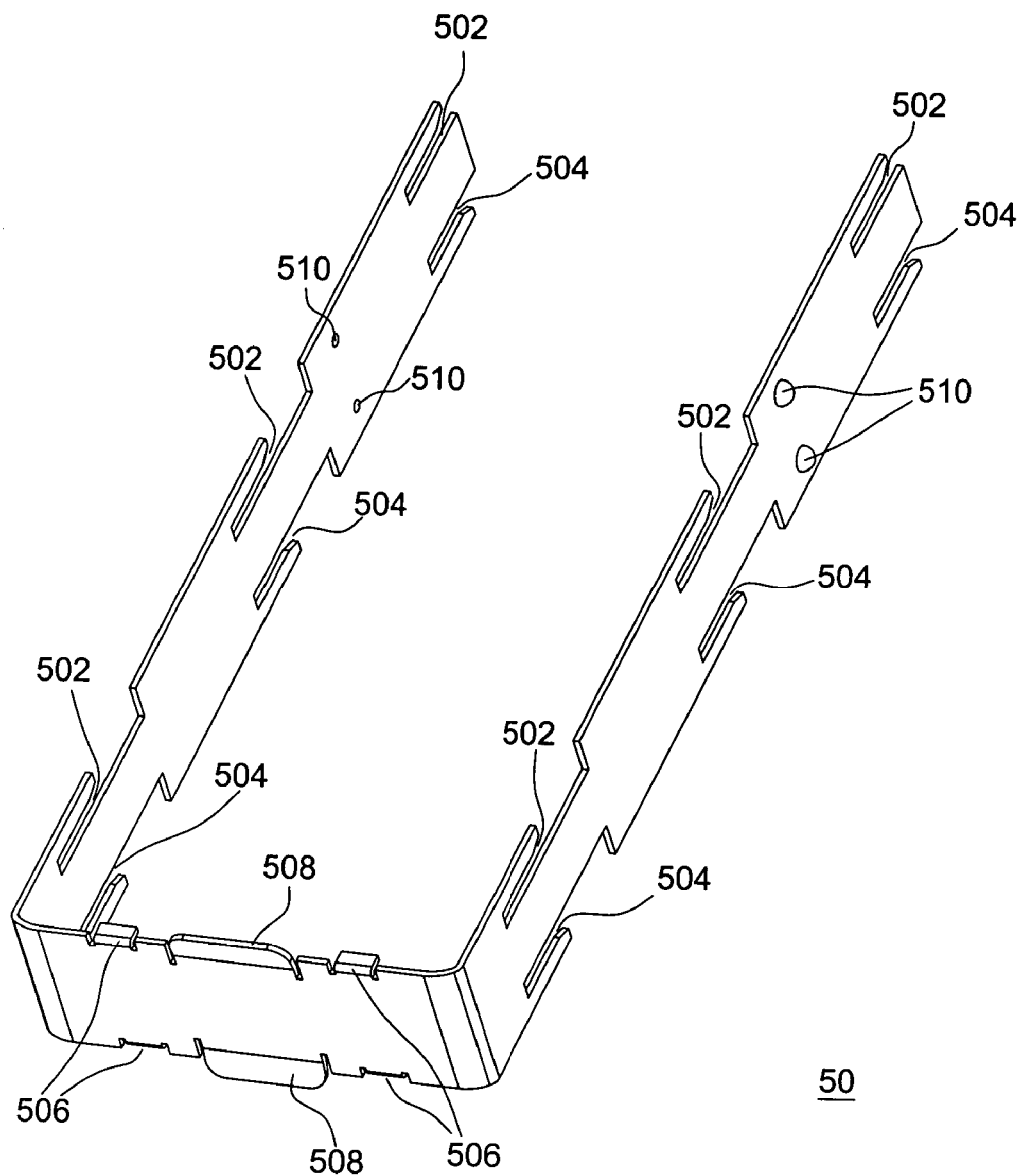
FIG. 4 shows a schematic diagram of the U-shaped slider.

As shown in FIG. 4, two arms of the U-shaped slider 50 have a first slot 502 and a second slot 504 respectively. After the third front housing 302 and the third rear housing 304 are assembled together, two arms of the U-shaped slider 50 are slidably disposed within the third housing by respectively passing through the two openings shown in FIG. 1. The U-shaped slider 50 including several hook portions 508 makes it easier for users to hold and move the U-shaped slider 50.

Figure 5:
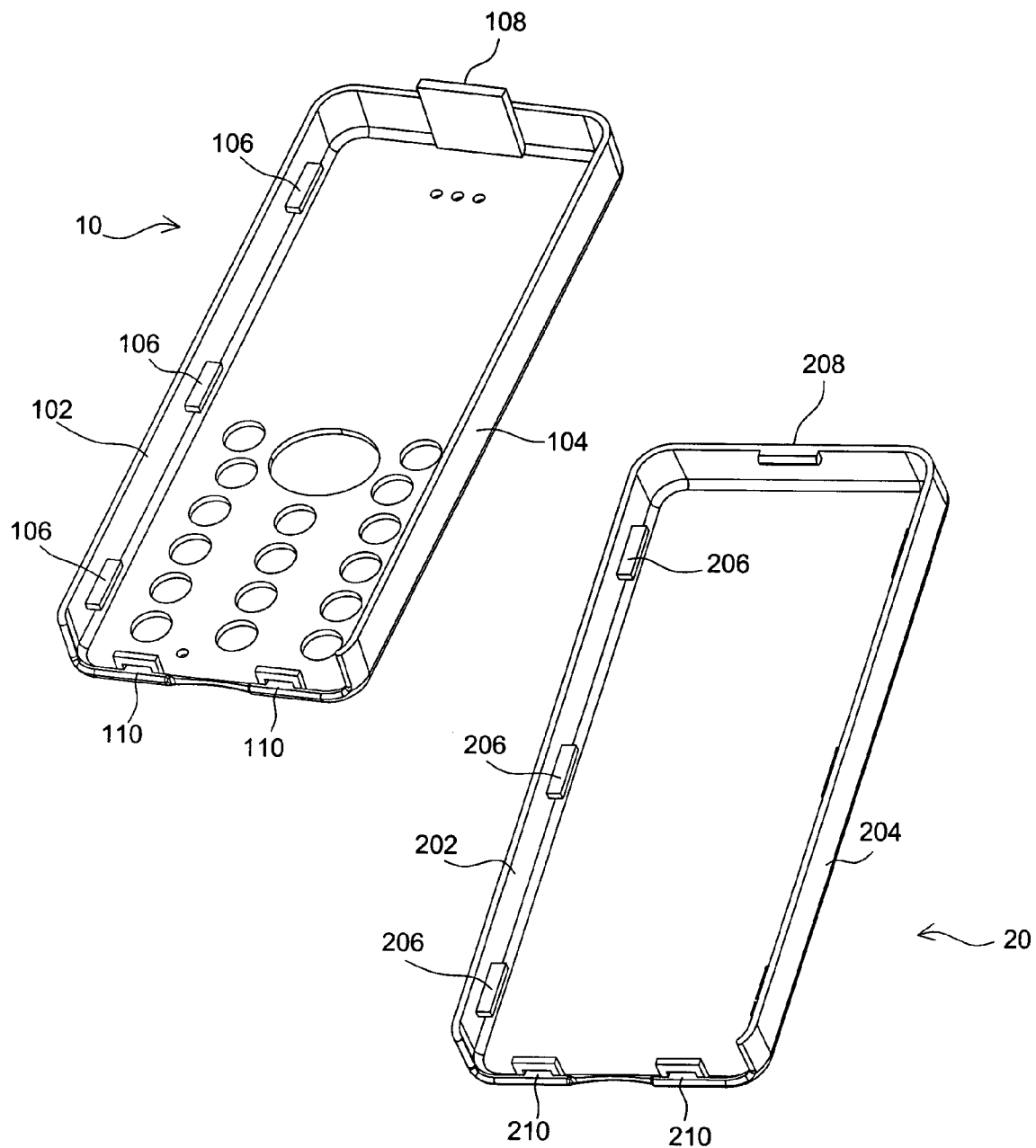
FIG. 5 shows a schematic diagram of the first housing and the second housing.
Figure 6A:
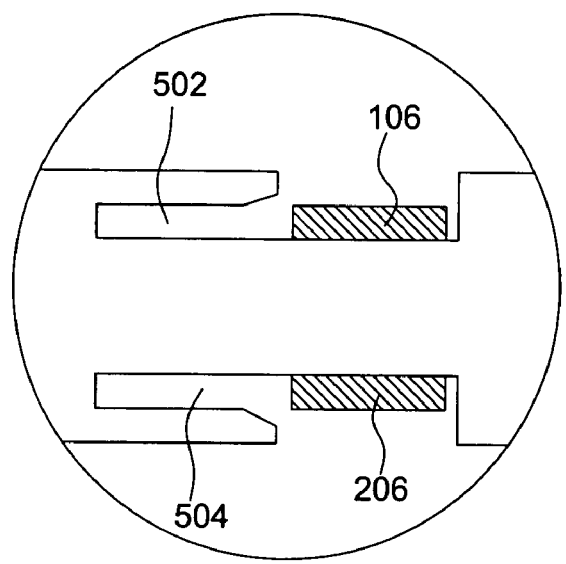
FIGS. 6A–6B show schematic diagrams of the accommodating the protrusions of the first and the second housing of the slots of the U-shaped slider.
Figure 6B:
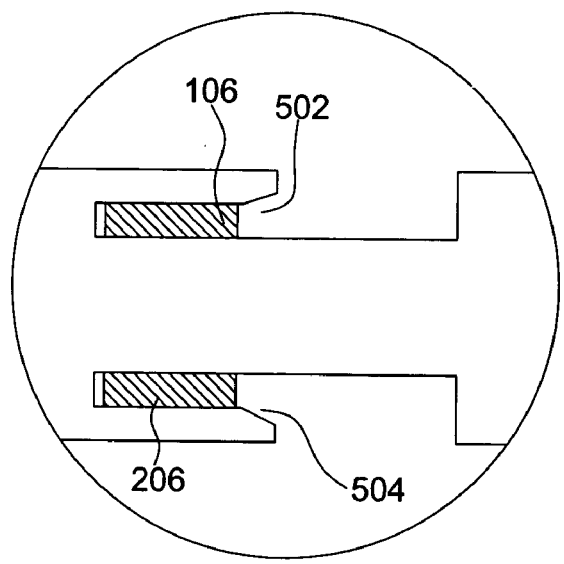

FIG. 5 shows a schematic diagram of a first housing 10 and a second housing 20. The first housing 10 includes two side-portions 102 and 104, respectively having a first protrusion 106. The second housing 20 includes two side-portions 202 and 204, respectively having a second protrusion 206. The first housing 10 includes a first clasp 108, and the second housing 20 includes a second clasp 208. When the first housing 10 is assembled with the second housing 20, the first clasp 108 and the second clasp 208 are joined together. The bonded first housing 10 and the second housing 20 define an inner space shown in FIGS. 3A–5. When the third housing 30 is disposed in the inner space, the U-shaped slider 50 fixes the first housing 10 and the second housing 20. Then the first protrusion 106 of the first housing 10 is disposed in the first slot 502 of the U-shaped slider 50 via the hole 306, and the second protrusion 206 of the second housing 20 is disposed in the second slot 504 of the U-shaped slider 50 via the hole 308, as shown in FIGS. 6A–6B.

Several locking devices are included in the housing assembly. As shown in FIGS. 3A–3C, the third front housing 302 includes a recess 314 and the third rear housing 304 includes a recess 316. The U-shaped slider 50 in FIG. 4 includes a protrusive point 510. When the first slot 502 and the second slot 504 respectively accommodate the first protrusion 106 and the second protrusion 206, the protrusive point 510 is disposed in the corresponding recess 314 and 316 to lock the U-shaped slider 50, preventing the U-shaped slider 50 from relative movement with the first housing 10 and the second housing 20.

As shown in FIGS. 5, the first housing 10 includes a first clip 110 and the second housing 210 includes a second clip 210. The U-shaped slider 50 in FIG. 4 includes a latch 506. When the first slot 502 and the second slot 504 respectively accommodate the first protrusion 106 and the second protrusion 206, the first clip 110 and the second clip 210 respectively buckle the corresponding latch 506 to lock the U-shaped slider 50, preventing the U-shaped slider 50 from relative movement with the first housing 10 and the second housing 20. The foregoing locking devices can be chosen selectively.

Figure 7:
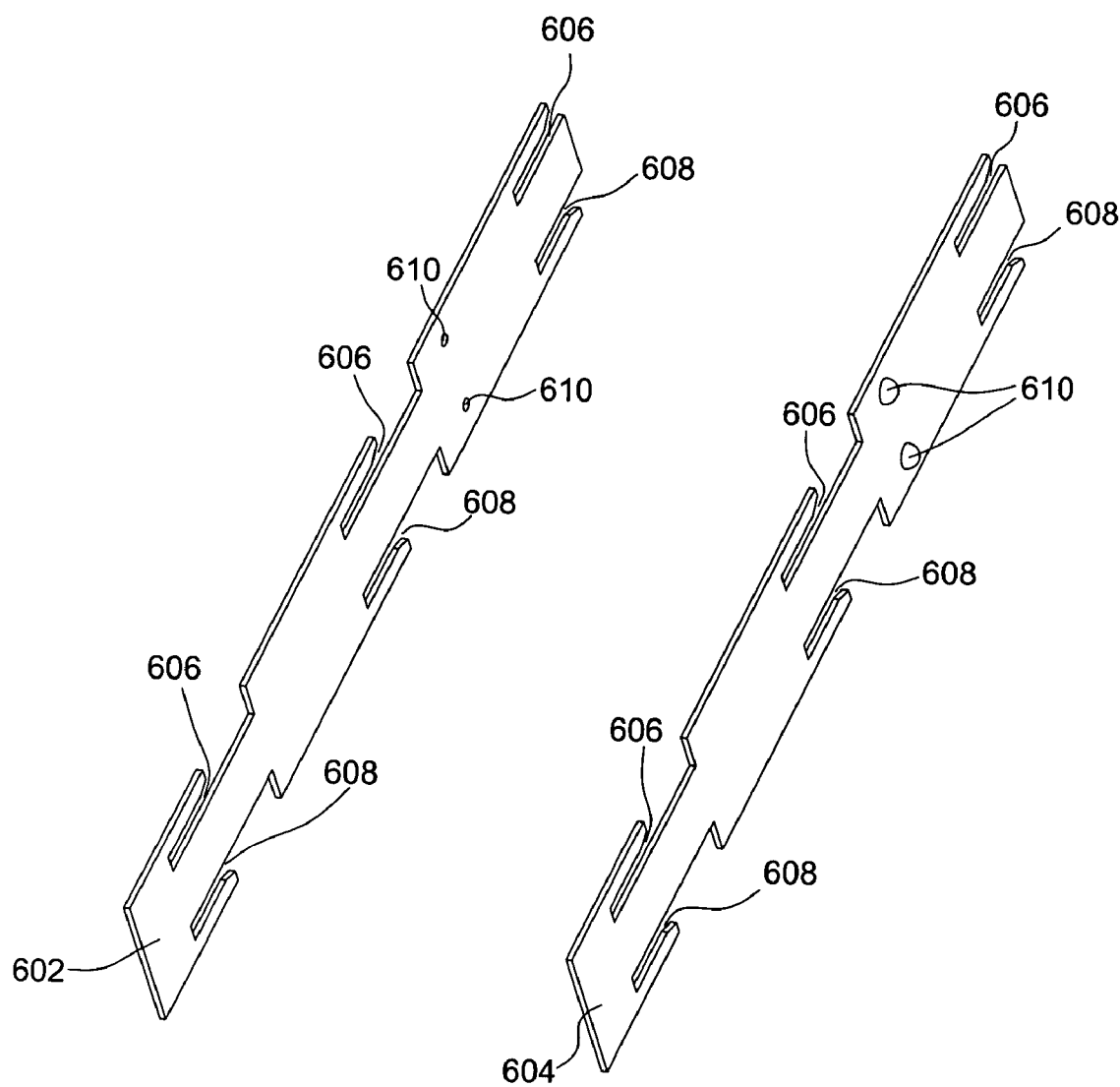
FIG. 7 shows schematic diagrams of the first and second sliders.

FIG. 7 shows schematic diagrams of the first and second sliders. The U-shaped slider 50 in FIG. 4 can be substituted by the first slider 602 and the second slider 604 shown in FIG. 7. The first slider 602 and the second slider 604 are slidably disposed within the third housing 30 by passing through the first opening 310 and the second opening 312. The first slider 602 and the second slider 604 respectively have a first slot 606 and a second slot 608, which can accommodate the first protrusion 106 of the first housing 10 and the second protrusion 206 of the second housing 20, as shown in FIGS. 6A–6B. The first slider 602 and the second slider 604 include the protrusive point 610 to fix the first plate 602 and the second plate 604.

While the invention has been described in connection with what is presently considered to be the most practical and preferred embodiments, it is to be understood that the invention is not to be limited to the discovered embodiments. The invention is intended to cover various modifications and equivalent arrangement included within the spirit and scope of the appended claims.

The invention claimed is:

1. A housing assembly of a portable electronic device, comprising:
    a first housing having two side-portions, the two side-portions having a first protrusion respectively;
    a second housing having two side-portions, the two side-portions of the second housing having a second protrusion respectively, and the first housing is selectively assembled with the second housing to define an inner space;
    a third housing selectively disposed in the inner space, the third housing having two openings and two holes; and
    a U-shape slider having two arms, the two arms having a first slot and a second slot for accommodating the first protrusion and the second protrusion respectively, the two arms being slidably disposed within the third housing by passing through the two openings respectively;
    wherein when the third housing is disposed in the inner space, the first protrusion and the second protrusion are disposed in the first slot and the second slot respectively within the third housing via the two holes;
    wherein the U-shaped slider further includes a locking device for preventing the U-shaped slider from making relative movement with the first housing and the second housing.

2. The housing assembly according to claim 1, wherein the portable electronic device is a cell phone, and the third housing is a module of the cell phone.

3. The housing assembly according to claim 1, wherein the locking device has two protrusive points respectively on the two arms, the third housing has at least two recesses corresponding to the two protrusive points for selectively connecting the first housing to the second housing.

4. The housing assembly according to claim 1, wherein the first housing further comprises a first clasp, the second housing further comprises a second clasp corresponding to the first clasp for selectively connecting the first housing to the second housing.

5. The housing assembly according to claim 1, wherein the first housing further comprises a first clip, the second housing further comprises a second clip corresponding to the first clip, the U-shape slider further comprises two latches for selectively respectively buckling the two latches to connect the first housing to the second housing.

6. The housing assembly according to claim 1, wherein the two arms of the U-shaped slider are substantially parallel to each other.

7. A housing assembly of a portable electronic device, comprising:
    a first housing having a first protrusion;
    a second housing having a second protrusion, and the first housing is selectively assembled with the second housing to define an inner space;
    a third housing selectively disposed in the inner space, the third housing having a first opening and a first hole; and a first slider having a first slot and a second slot for accommodating the first protrusion and the second protrusion, the first slider being slidably disposed within the third housing by passing through the first opening;

wherein when the third housing is disposed in the inner space, the first protrusion and the second protrusion are disposed in the first slot and the second slot respectively within the third housing via the first hole;

wherein the first slider further includes a locking device for preventing the first slider from making relative movement with the first housing and the second housing.

8. The housing assembly according to claim 7, wherein the portable electronic device is a cell phone, the third housing is a module of the cell phone.

9. The housing assembly according to claim 7, wherein the first housing further comprises a first clasp, the second housing further comprises a second clasp corresponding to the first clasp for selectively connecting the first housing to the second housing.

10. The housing assembly according to claim 7, wherein the locking device has a protrusive point on the first slider, the third housing has a recess corresponding to the protrusive point for selectively connecting the first housing to the second housing.

11. The housing assembly according to claim 7, wherein the first housing further comprises a first clip, the second housing further comprises a second clip corresponding to the first clip, the first slider further comprises two latches for selectively respectively buckling the two latches to connect the first housing to the second housing.

12. The housing assembly according to claim 7, further comprising:
- a third protrusion;
- a fourth protrusion;
- a second opening and a second hole, located on the third housing respectively; and
- a second slider having a third slot and a fourth slot for accommodating the third protrusion and the fourth protrusion respectively, the second slider being slidably disposed within the third housing by passing through the second opening.

13. The housing assembly according to claim 12, wherein the second slider further comprises a locking device for fastening the first housing with the second housing.

14. The housing assembly according to claim 13, wherein the locking device has a protrusive point on the second slider, the third housing has a recess corresponding to the protrusive point for selectively connecting the first housing to the second housing.

15. The housing assembly according to claim 12, wherein the first housing further comprises a third clip, the second housing further comprises a fourth clip corresponding to the third clip, the second slider further comprises two latches for selectively respectively buckling the two latches to connect the first housing to the second housing.

* * * * *